(12) United States Patent
Bernardo Gavito et al.

(10) Patent No.: US 11,061,647 B2
(45) Date of Patent: Jul. 13, 2021

(54) NONDETERMINISTIC RESPONSE TO A CHALLENGE

(71) Applicant: QUANTUM BASE LIMITED, Cheshire (GB)

(72) Inventors: Ramon Bernardo Gavito, Lancaster (GB); Robert James Young, Lancaster (GB)

(73) Assignee: QUANTUM BASE LIMITED, Cheshire (GB)

( * ) Notice: Subject to any disclaimer, the term of this patent is extended or adjusted under 35 U.S.C. 154(b) by 135 days.

(21) Appl. No.: 16/323,846

(22) PCT Filed: Jul. 24, 2017

(86) PCT No.: PCT/GB2017/052159
§ 371 (c)(1),
(2) Date: Feb. 7, 2019

(87) PCT Pub. No.: WO2018/029440
PCT Pub. Date: Feb. 15, 2018

(65) Prior Publication Data
US 2019/0179616 A1    Jun. 13, 2019

(30) Foreign Application Priority Data

Aug. 8, 2016 (GB) ..................................... 1613595

(51) Int. Cl.
*G06F 7/58* (2006.01)

(52) U.S. Cl.
CPC .................... *G06F 7/588* (2013.01)

(58) Field of Classification Search
CPC ................................ G06F 7/588; H03B 7/08
See application file for complete search history.

(56) References Cited

U.S. PATENT DOCUMENTS 8,680,906 B1    3/2014 McDonald et al.
10,862,679 B2*  12/2020 Young .................. H04L 9/0866
(Continued)

FOREIGN PATENT DOCUMENTS

GB    2543125 A    12/2017
GB    2543126 A    12/2017
(Continued)

OTHER PUBLICATIONS

Roberts, J. et al. in "Using Quantum Confinement to Uniquely Identify Devices" on Sci Rep 5, 16456 (2015). Retrieved on [Aug. 11, 2020], Retrieved from the Internet <https://doi.org/10.1038/srep16456> (Year: 2015).*

(Continued)

*Primary Examiner* — Aimee Li
*Assistant Examiner* — Carlo Waje
(74) *Attorney, Agent, or Firm* — Hoffman Warnick LLC

(57) ABSTRACT

A device for generating a nondeterministic response to a challenge, the device comprising: a structure that exhibits a nondeterministic electrical output response to an electrical input, the device being arranged to facilitate a challenge of the structure to generate the nondeterministic response, by facilitating an electrical measurement of an output of the structure, the nondeterministic response being derivable from that measurement.

14 Claims, 7 Drawing Sheets

(56) References Cited

U.S. PATENT DOCUMENTS

| | | | |
|---|---|---|---|
| 2008/0073641 A1* | 3/2008 | Cheng | H01L 29/7378 257/25 |
| 2009/0077147 A1* | 3/2009 | Hars | H04L 9/0861 708/251 |
| 2013/0099872 A1 | 4/2013 | Pickett et al. | |
| 2016/0202954 A1 | 7/2016 | Manipatruni et al. | |
| 2018/0067723 A1* | 3/2018 | Chan | H03K 17/74 |
| 2019/0272368 A1* | 9/2019 | Bernardo Gavito | G06F 21/73 |
| 2020/0186368 A1* | 6/2020 | Roberts | H04L 9/3278 |

FOREIGN PATENT DOCUMENTS

| | | |
|---|---|---|
| JP | 2005018500 A | 1/2005 |
| JP | 2005293489 A | 10/2005 |
| WO | 2015047328 A1 | 4/2015 |

OTHER PUBLICATIONS

Young et al in "Using quantum effects in nanomaterials for unique identification" on SPIE, Jan. 2016. Retrieved on [Aug. 11, 2020], Retrieved from the Internet <https://spie.org/news/6250-using-quantum-effects-in-nanomaterials-for-unique-identification?SSO=1> (Year: 2016).*

Bernardo-Gavito, R.. et al. in "Extracting random numbers from quantum tunnelling through a single d from quantum tunnelling through a single diode" on Sci Rep 7, 17879 (2017). Retrieved from the Internet <https://doi.org/10.1038/s41598-017-18161-9> (Year: 2017).*

Frauchigeretal. in "True randomness from realistic quantum devices". Retrieved on [Aug. 13, 2020], Retrieved from the Internet <https://arxiv.org/pdf/1311.4547.pdf> (Year: 2013).*

Romeira et al. in "Excitability and optical pulse generation in semiconductor lasers driven by resonant tunneling diode photo-detectors" in Optics Express vol. 21, Issue 8, p. 20931-20940 (2013) https://doi.org/10.1364/OE.21.020931 (Year: 2013).*

Maezawa et al., "Direct Observation of High-Frequency Chaos Signals from the Resonant Tunneling Chaos Generator," Japanese Journal of Applied Physics, vol. 43, No. 8A, 2004, pp. 5235-5238.

B. Romeira et al., "Mixed mode oscillations in a forced optoelectronic circuit for pattern and random bit generation," IEEE 2014, 2 pages.

GB Examination and Search Report issued in connection with corresponding GB Application No. GB1613595.6 dated Mar. 31, 2017, 4 pages.

GB Examination and Search Report issued in connection with corresponding GB Application No. GB1613595.6 dated Aug. 30, 2016, 8 pages.

GB Examination and Search Report issued in connection with corresponding GB Application No. GB1613595.6 dated Dec. 13, 2016, 4 pages.

GB Examination and Search Report issued in connection with corresponding GB Application No. GB1613595.6 dated Jan. 10, 2018.

* cited by examiner

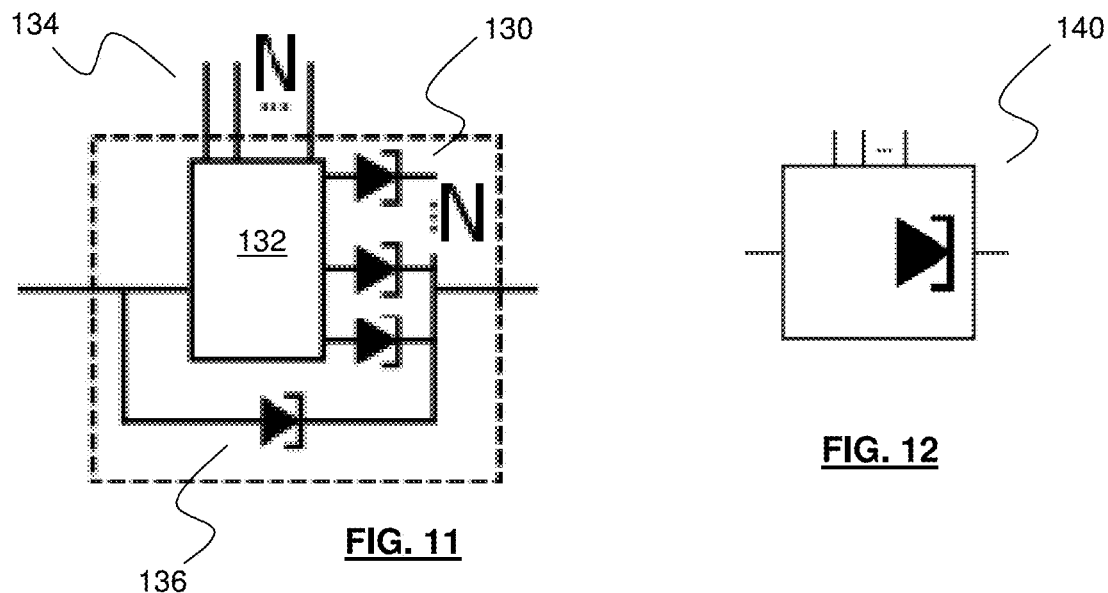
FIG. 11
FIG. 12
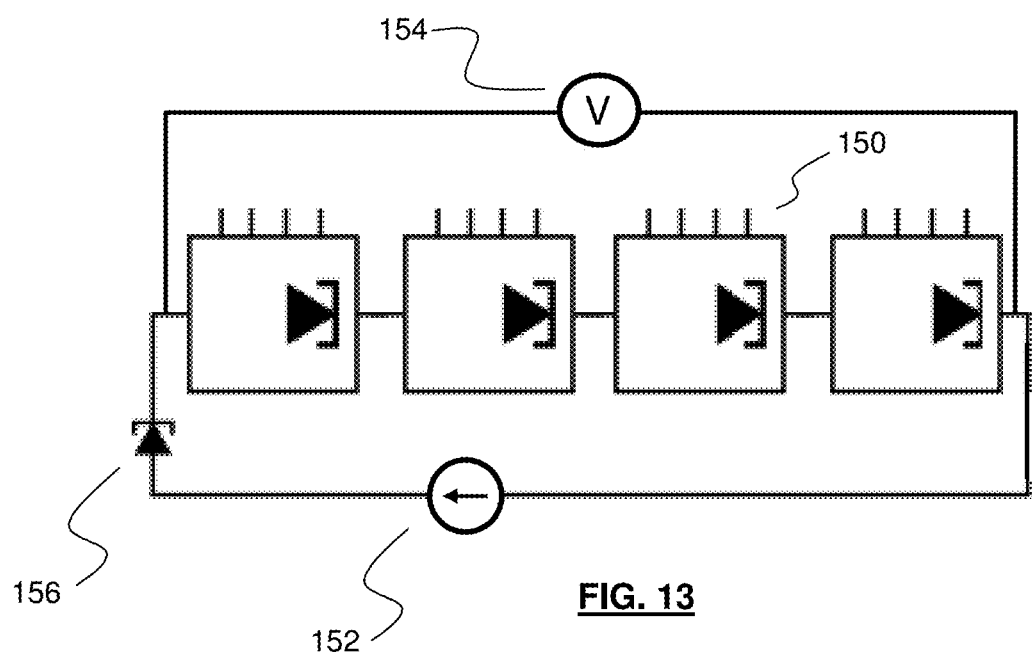
FIG. 13

NONDETERMINISTIC RESPONSE TO A CHALLENGE

The present invention relates generally to generating a nondeterministic response to a challenge, in terms of a device and system for such generating, and a method of such generating.

Random numbers are important in modern systems. For example, random numbers may be important for use in computer encryption, lotteries, scientific modelling, and gambling. Current methods of generating random numbers can produce predictable results, which is not desirable. For instance, a problem of generating random numbers using some methods lies in the fact that computers used in such methods work in a predictable way, running calculations and algorithms, and producing answers based on mathematics. Even with alternative approaches, not relying solely on computer calculations or algorithms, there might still exist patterns which result, again, in a degree of predictability.

A random number generator should ideally be as nondeterministic as possible or practical in a given application.

It is an example aim of example embodiments of the present invention to at least partially obviate or mitigate at least one disadvantage of the prior art, whether identified herein or elsewhere, or to at least provide an alternative to the prior art.

According to the present invention there is provided an apparatus and method as set forth in the appended claims. Other features of the invention will be apparent from the dependent claims, and the description which follows.

According to a first aspect of the invention, there is provided a device for generating a nondeterministic response to a challenge, the device comprising: a structure that exhibits a nondeterministic electrical output response to an electrical input, the device being arranged to facilitate a challenge of the structure to generate the nondeterministic response, by facilitating an electrical measurement of an output of the structure, the nondeterministic response being derivable from that measurement.

The nondeterministic electrical output response might have a probability distribution, and/or the nondeterministic electrical output may be nondeterministic in that two or more electrical outputs are possible from a single electrical input.

The nondeterministic electrical output response: may be linked to a change in state of the structure from a first state to a second state; and/or may comprise a change in electrical output from a first level to, or beyond, a second, threshold level.

The device may be arranged to facilitate the challenge such that an electrical input value increases or decreases, optionally at a constant rate, to trigger the nondeterministic electrical output response.

The device may be arranged to facilitate the electrical measurement such that a time taken for the nondeterministic electrical output response to be triggered is measured, the nondeterministic response being derivable from that time measurement.

The device may be arranged to facilitate the challenge such that an input of an electrical input value is repeated, to trigger the nondeterministic electrical output response.

The nondeterministic response being may be derivable from the measurement, in that the nondeterministic response is, or is based on: a time taken for an electrical input to trigger the nondeterministic electrical output response; and/or an input value at which the nondeterministic electrical output response is triggered; and/or a number of inputs at which the nondeterministic electrical output response is triggered.

The nondeterministic electrical output response may have a probability distribution, and the device is arranged to facilitate a challenge that is tuned relative to that probability distribution.

The structure may exhibit negative differential resistance.

The structure may exhibit quantum mechanical confinement, and the structure may be arranged to provide a unique response when challenged with an electrical measurement, the unique response being linked to the atomic makeup of the structure that defines the quantum mechanical confinement.

The device may be arranged to facilitate a challenge that is tuned relative to that unique response.

The device may comprise a plurality of structures, the device being arranged to facilitate a selective challenge of: a structure of the plurality in isolation, or in electrical combination with another structure.

The device may be arranged to facilitate a challenge that is tuned relative to a unique response, and/or a probability distribution, associated with a structure of the plurality, or associated with structures of the plurality that are connected or connectable in electrical combination.

According to a second aspect of the invention, there is provided a system for generating a nondeterministic response to a challenge, the system comprising a first device for challenging a second device, the second device comprising: a structure that exhibits a nondeterministic electrical output response to an electrical input, the second device being arranged to facilitate a challenge of the structure to generate the nondeterministic response, by facilitating an electrical measurement of an output of the structure, the first device being connected or connectable to the second device in order to perform the measurement, the nondeterministic response being derivable from the electrical measurement, According to a third aspect of the invention, there is provided a method of generating a nondeterministic response to a challenge, the method comprising: challenging a structure to generate the nondeterministic response, by electrically measuring an output of the structure, the nondeterministic response being derivable from the electrical measurement; wherein the structure exhibits a nondeterministic electrical output response to an electrical input.

For the avoidance of any doubt, one or more features described in relation to any one aspect of the present invention may be used in combination with or in place of any one or more features of another aspect of the present invention, unless such replacement or combination would be understood by the skilled person from a reading of this disclosure to be mutually exclusive. For example, and more particularly, any feature described in relation to an apparatus aspect of the present invention may be readily used in place of or in combination with any feature described in relation to a system or method aspect of the present invention.

For a better understanding of the invention, and to show how embodiments of the same may be carried into effect, reference will now be made, by way of example, to the accompanying diagrammatic Figures in which:

FIG. 1 schematically depicts a device for generating a nondeterministic response to a challenge, according to an example embodiment;

Figure 5:
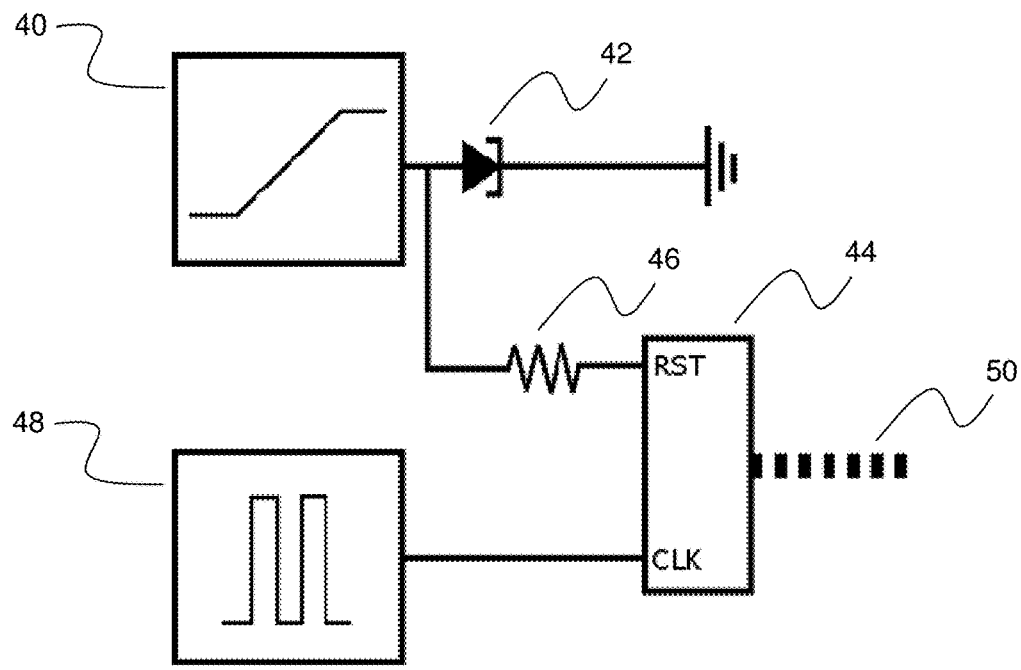
Figure 6:
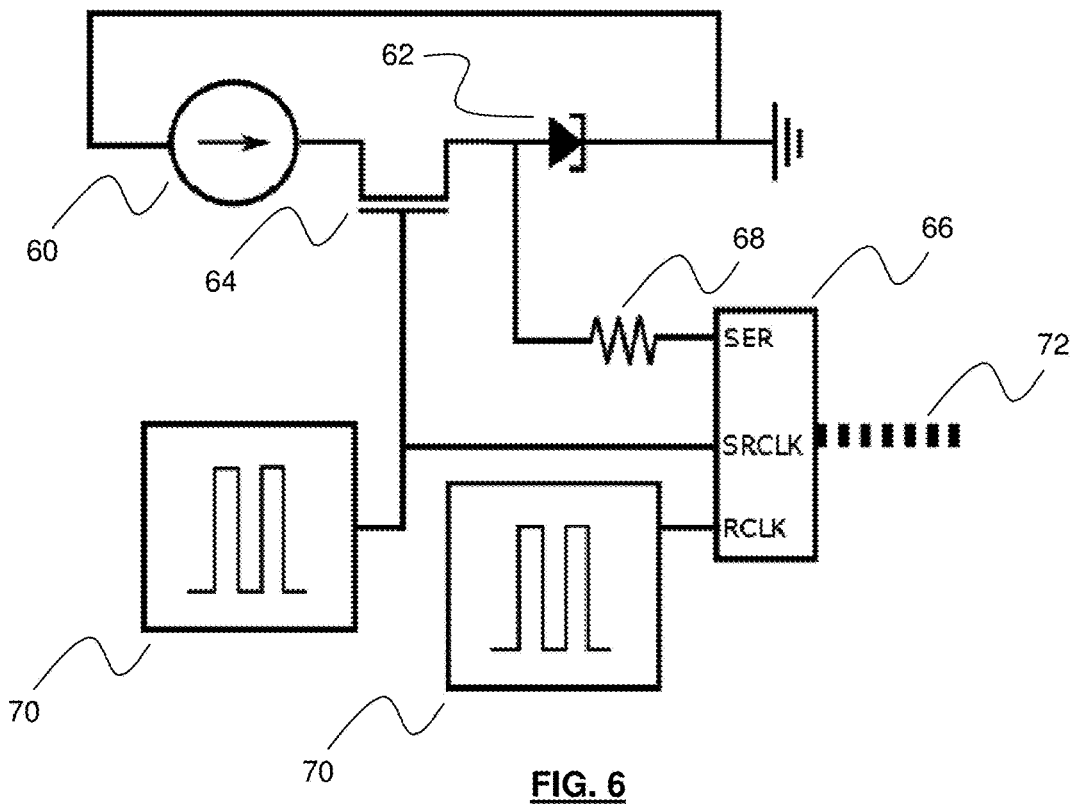
Figure 7:
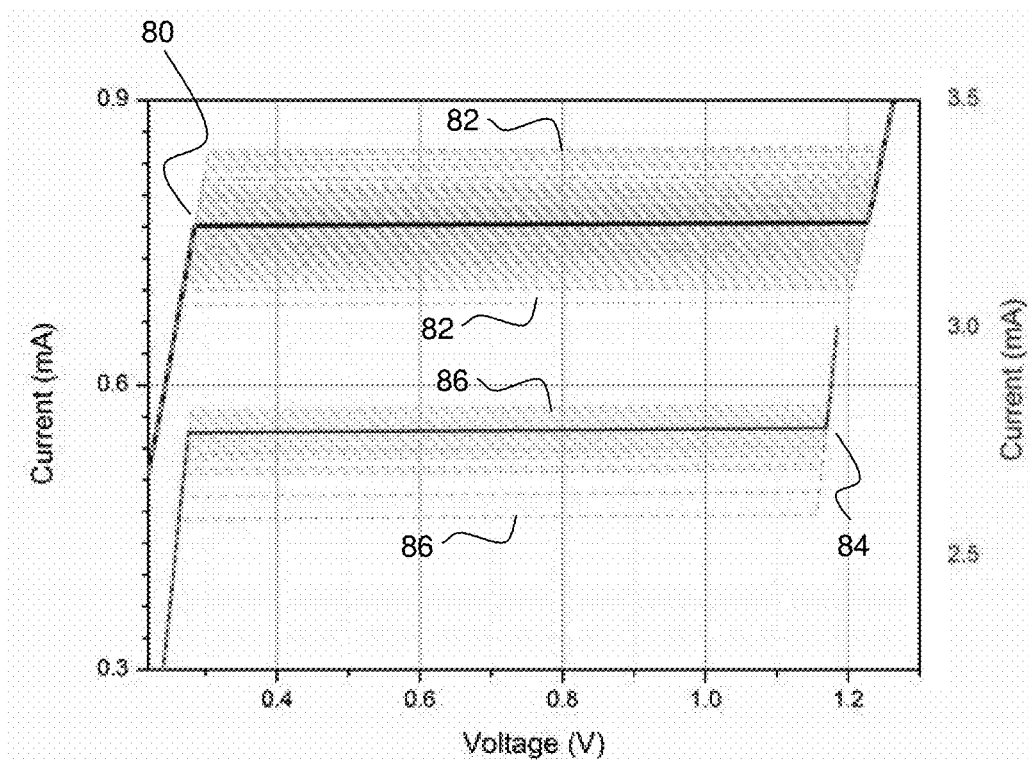
Figure 8:
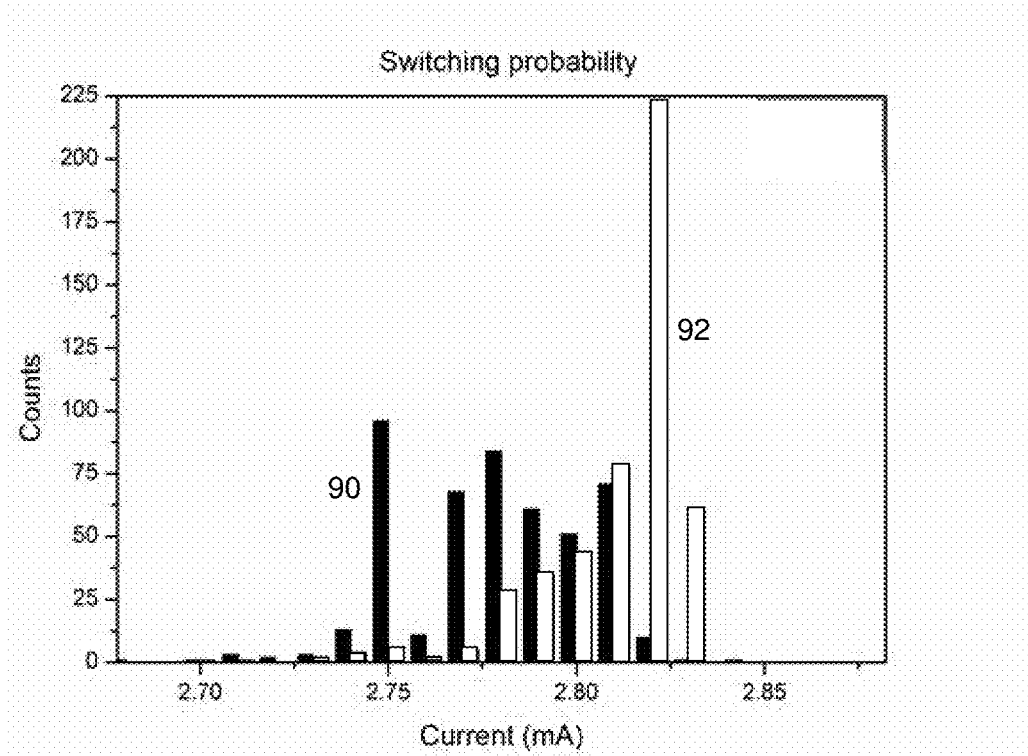
Figure 9:
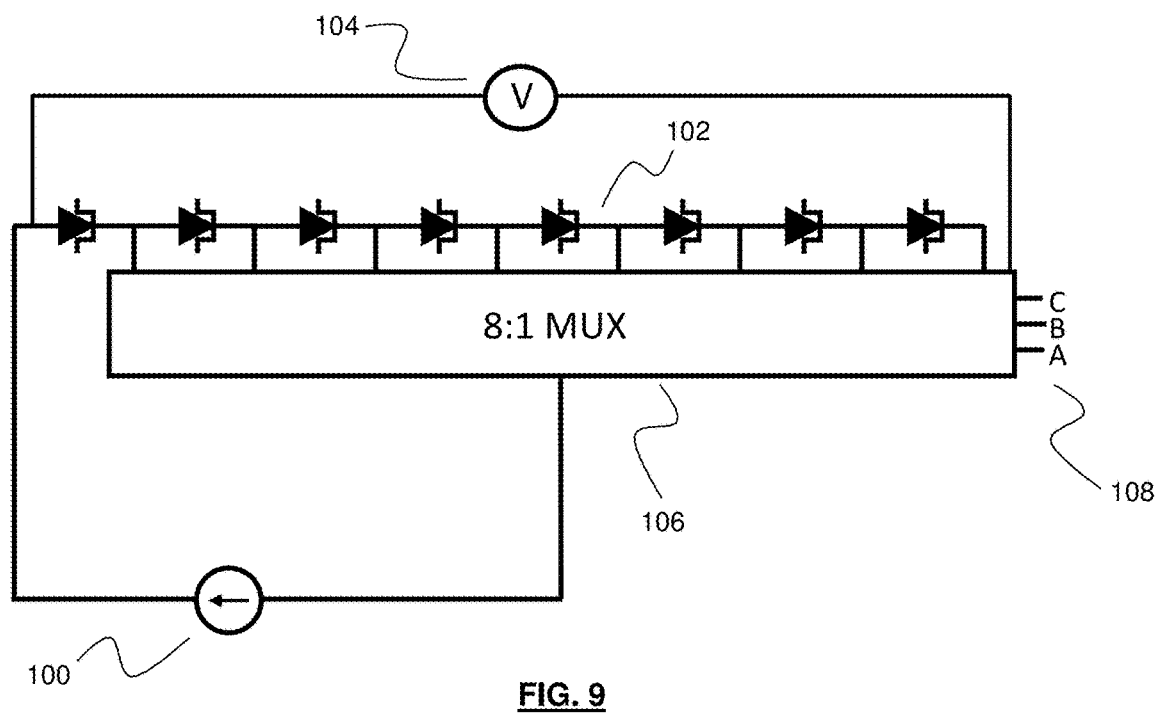
Figure 10:
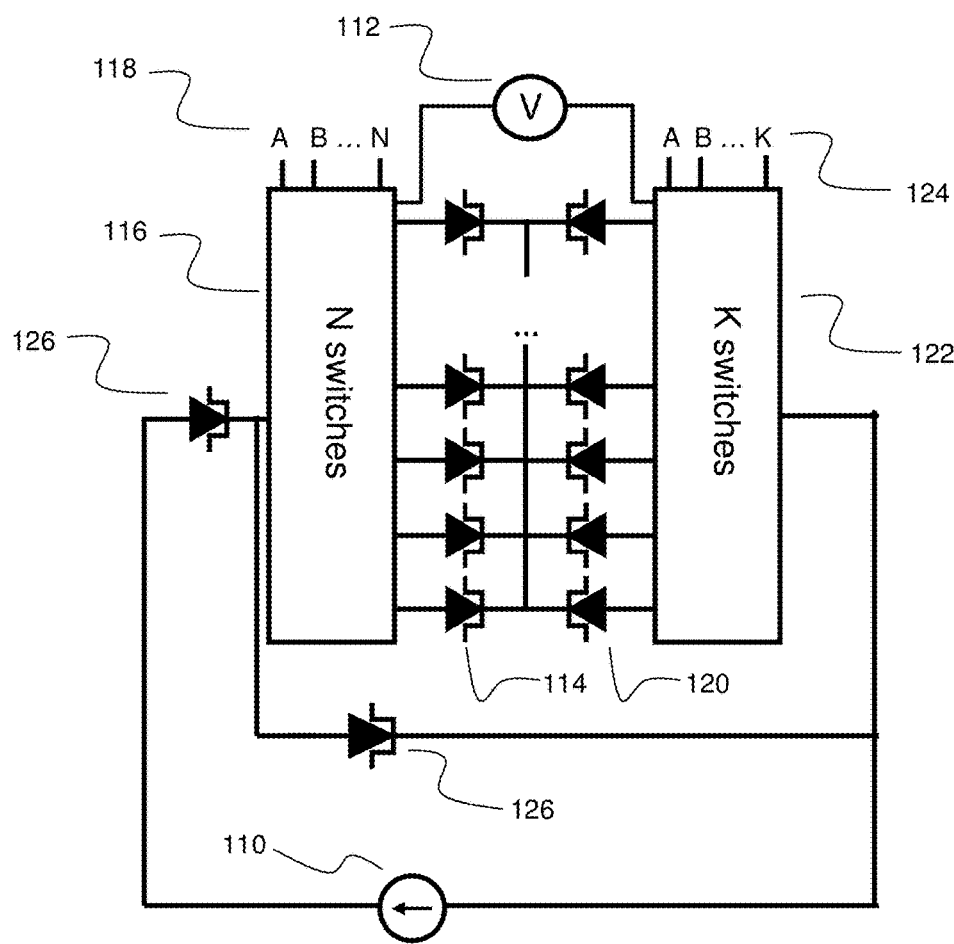
Figure 14:
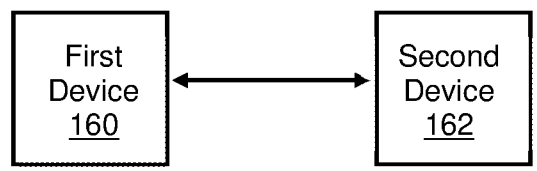
Figure 15:
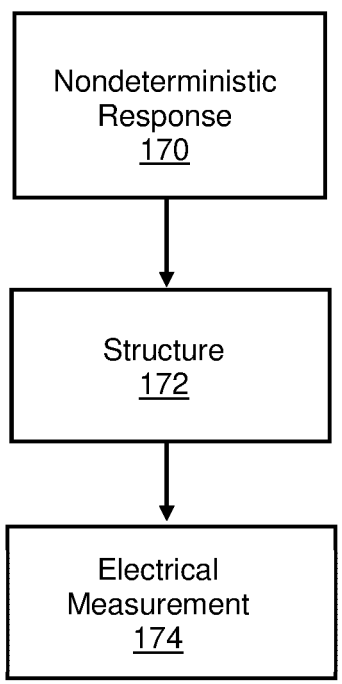

FIG. 5 schematically depicts apparatus for use in determining nondeterministic responses, according to an example embodiment;

FIG. 6 schematically depicts apparatus for use in determining nondeterministic responses, according to another example embodiment;

FIG. 7 is a graph schematically depicting probability distributions for the nondeterministic responses of two different structures, according to an example embodiment;

FIG. 8 is a graph schematically depicting probability distributions for the nondeterministic responses of two different structures, according to another example embodiment;

FIG. 9 schematically depicts how a number of structures may be electronically connectable with respect to one another, in order to obtain different probability distributions for nondeterministic responses of different structures or combinations of structures, according to an example embodiment;

FIG. 10 schematically depicts how a number of structures may be electronically connectable with respect to one another, in order to obtain different probability distributions for nondeterministic responses of different structures or combinations of structures, according to another example embodiment;

FIG. 11 schematically depicts how a number of structures may be electronically connectable with respect to one another, in order to obtain different probability distributions for nondeterministic responses of different structures or combinations of structure, according to another example embodiment;

FIG. 12 schematically depicts the apparatus of FIG. 11 in the form of a single unit;

FIG. 13 schematically depicts the use of multiple units of FIG. 12 in series;

FIG. 14 schematically depicts a system according to an example embodiment, comprising first and second devices; and FIG. 15 schematically depicts a general methodology according to example embodiment.

As already discussed above, a random number generator, or in other words a device for generating a nondeterministic response to a challenge, should ideally be as nondeterministic as possible or practical in a given application. This might mean that the random or nondeterministic response is sufficiently unpredictable, given confines of time, resources, and so on. It has been realised that this can be achieved by involving a specific real world structure as an input in the nondeterministic response generation. Specifically, it has been realised that a structure that exhibits a nondeterministic electrical output response to an electrical input can be used. That is, a structure can be used that does not have a single definite and predictable (with absolute certainty) output for a single particular input. Instead, the nondeterministic electrical output is nondeterministic in that two or more electrical outputs are possible from a single electrical input. The device is therefore unstable at that input value or range of values. In other words, there is only a probability that a certain output will result from a certain input. The nondeterministic response of the device as a whole can therefore be derived from (which includes be) the nondeterministic electrical output response of the structure.

The nondeterministic electrical output might be linked to a change from a first state to a second state in or of the structure; and/or comprises a change in electrical output from a first level to, or beyond, a second, threshold level. For instance, and with the instability and related probability in mind, the structure might switch or jump to a more or less resistive or conductive state at a particular electrical input.

A useful structure that might be used to fulfill the above criteria is a structure that exhibits negative differential resistance. Such devices are known to be inherently instable, in that at certain selected electrical input values (typically current, but also sometimes voltage), there might be multiple possible output values (typically voltage, but also sometimes current). That is, the structure exhibits instability at such input values, such that there is only a probability of the structure changing between different resistive/conductive states, and that it is not possible to know with certainty that an input of 'X' will definitely result in an output of 'Y'. Such structures are also useful in that they are typically readily available, for example in the form from a resonant tunnelling diode (RTD), a Gunn diode, a memristor and so on. Of course, a structure that exhibits negative differential resistance is not essential. Any structure that exhibits electrical instability largely as described above will be useful.

It has been further realised that a structure that additionally exhibits quantum mechanical confinement might have further benefits. The quantum mechanical nature of the implementation typically allows the device or its structures to be small, and be low power. By the very nature of devices or structures exhibiting quantum mechanical confinement, the device or structure does not need to be a dedicated external device or structure—i.e. the device or structure can be part of a device or structure (e.g. on a chip of a system) that has other functionality, related to (e.g. using) or completely separate from the nondeterministic generation.

Perhaps most importantly, however, is that the quantum mechanical nature of the structures allows for the response to electrical inputs to be particularly unique and sharp or pronounced (e.g. sharp or narrow peaks). For example, such structures might exhibit sharp or pronounced peaks in I-V characteristics, and it is about and/or around such peaks where the instability described above might be present, more pronounced, or more useful in a practical implementation. Also, such characteristics will be extremely sensitive to the atomic makeup of the structure, to the extent that the response of each structure that additionally exhibits quantum mechanical confinement might be considered as unique. This means that two structures that might nominally be considered as being the same might actually exhibit subtly and uniquely different electrical outputs. These differences can be used to generate different distributions of nondeterministic responses.

In more detail, the unique nature of the response of a structure that additionally exhibits quantum mechanical confinement might be particularly the case, or particularly noticeable and useable, when the quantum mechanical effect that is measured is a spectrum or spectra (e.g. a combination or convolution of more than one spectrum, or measurements or more than one distinct spectrum). For instance, a device or structure exhibiting quantum mechanical confinement, particularly in two or more dimensions, may provide a unique measurable spectrum of specific confinement energy levels of electrons or holes in the structure of the device (or part thereof) that exhibits the confinement. Typically this part of the structure may be a nano-structure (or similar) in the form of a well, wire, layer, ring, dot, or other structure, that has spatial dimensions at or below length scales corresponding to the de Broglie wavelength of electrons in the system. The physical properties of such a nano-structure (or similar), including its atomic arrangement, size and composition, and the exact form of fields (e.g. strain, magnetic and electric) through the structure may all have an influence on the energies at which charge carriers are confined, according to solutions of the Schrodinger equation for the system. As will be appreciated, it is practically impossible to fabricate two structures that share all of these properties (and possibly more), so no two structures will be exactly the same. Therefore, the nature of confinement will not be the same, and therefore no two measurable quantum mechanical effects as a result of that confinement will be the same. So, the measurable quantum mechanical effect for such a structure can be used to provide a unique set or distribution of nondeterministic responses for that device or a structure thereof.

Principles underlying the invention, and example implementations of the invention, will now be described, by way of example only, with reference to the Figures. The Figures have not been drawn to any particular scale, and are simply provided as diagrammatic aids for understanding the principles underlying the invention, and/or its application.

Figure 1:
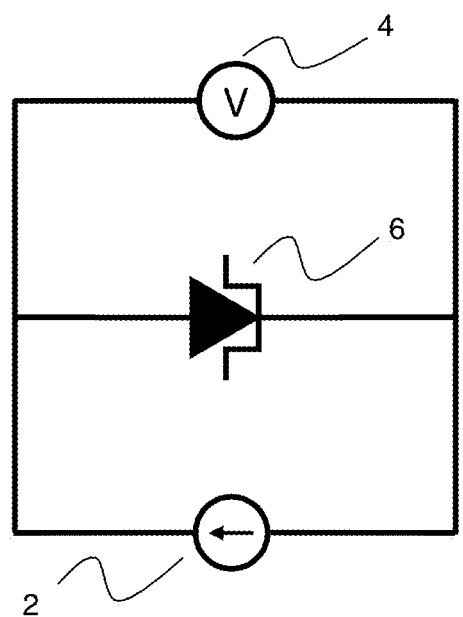

FIG. 1 schematically depicts a device for generating a nondeterministic response to a challenge. The device comprises a variable current source 2 and a voltage measuring device 4. The variable current source is used to provide a selective (e.g. controllable) input to a structure 6 that exhibits a nondeterministic electrical output response to an electrical input. In this case, structure 6 is a resonant tunneling diode, which exhibits negative differential resistance and also quantum mechanical confinement. The voltage measuring device 4 measures the voltage across structure 6 (i.e. the output of the diode) as current is input from variable current source 2 to structure 6.

Figure 2:
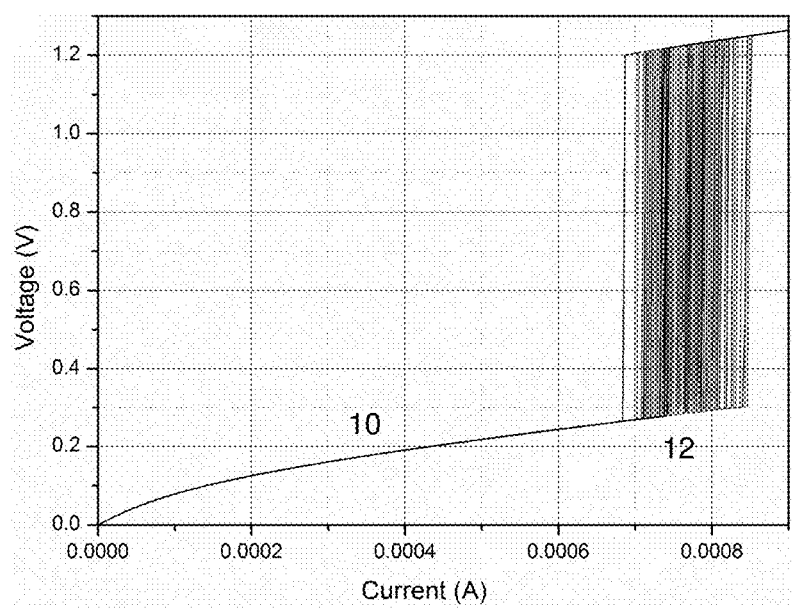
FIG. 2 is a graph schematically depicting different nondeterministic responses to challenges using the device of FIG. 1, according to an example embodiment.

FIG. 2 is a graph schematically depicting a current voltage (I-V) characteristic 10, 12 for the diode of FIG. 1. It can be seen that for a first region of the characteristic 10, an input current value results in a single output voltage value. That is, the structure is electrically stable in this region. For a second region of the characteristic 12, an input current value results in a nondeterministic response. That is, in this region 12, the structure is electrically unstable.

The region 12 does not show the input-output relation for a single input to (i.e. challenge of) the structure. Instead, the region 12 shows the input-output relation over multiple inputs at the same or different values. In other words, the region 12 shows that for inputs in this region 12, there is a probability that the structure will switch or jump between states of significantly different resistance. Already, it will be appreciated that it is not possible within region 12 to know with certainty what output will result from what input. So, the response of the structure is nondeterministic, and the response can be used to generate, for example, a random number linked to that response.

Figure 3:
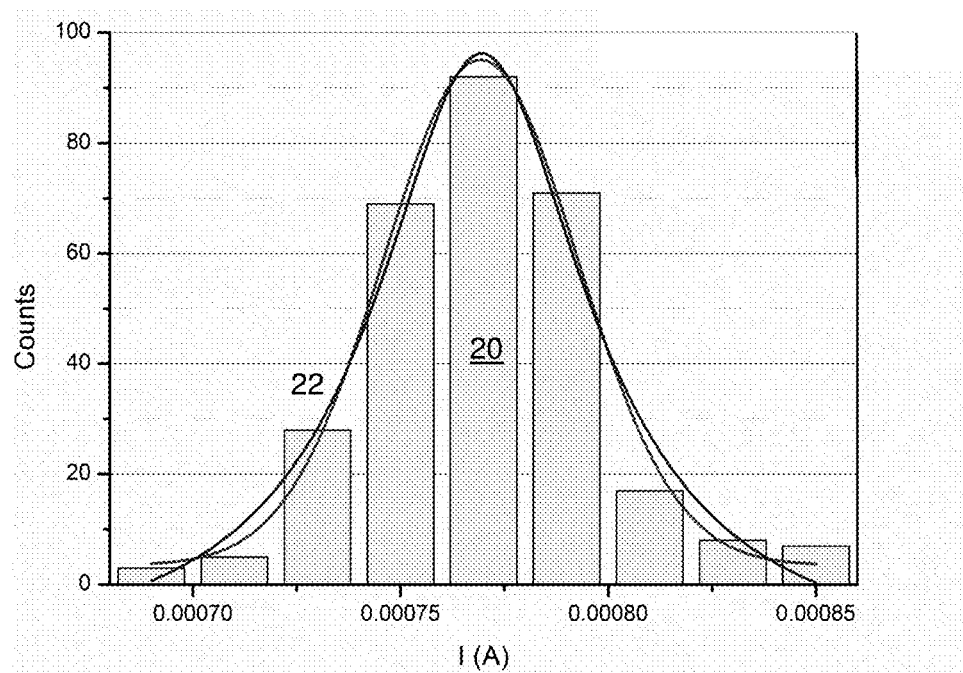
FIG. 3 is a graph schematically depicting a probability distribution for the nondeterministic responses of FIG. 2.

There is a probability distribution associated with the switching of FIG. 2, which distribution is shown in FIG. 3. FIG. 3 shows the number of counts (times) 20 at which input current results in a switch in the output voltage, corresponding to the change in resistance state of the structure (diode). The counts might define or fit a particular curve or distribution 22, for example a Gaussian or Lorentzian distribution.

Figure 4:
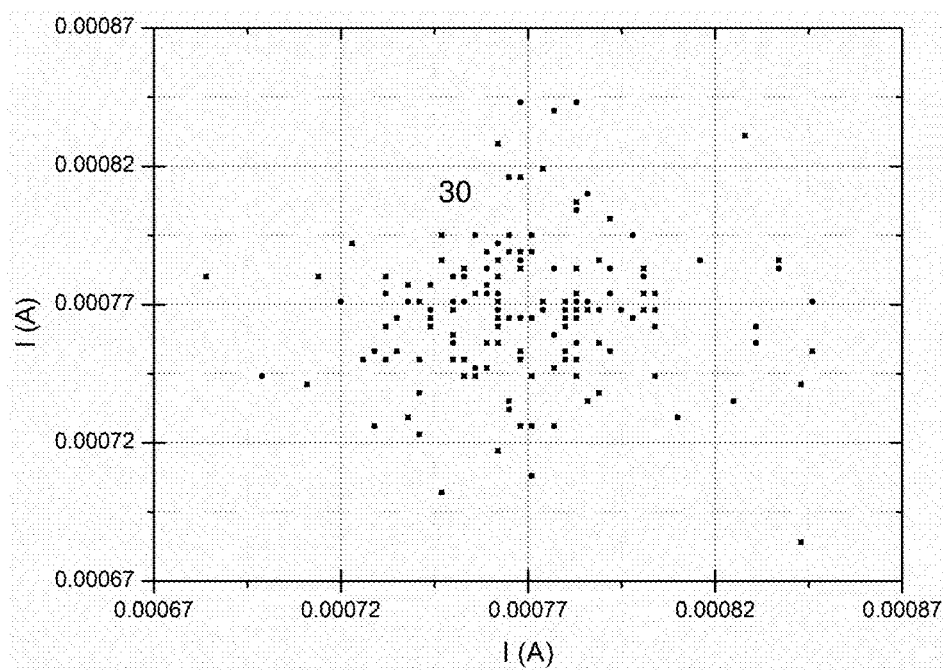
FIG. 4 is a plot schematically depicting nondeterministic responses of the device of FIG. 1, over time, according to an example embodiment.

FIG. 4 is a graph of outputs 30, over time, from the device that was used to produce the outputs in FIGS. 2 and 3. Referring to FIG. 4, no correlation (in time) exists between outputs from the device, illustrating an independence in the output to external factors, such as temperature drift and so on.

The graph in FIG. 3 already hints at different ways in which nondeterministic responses may be generated in a practical environment. For example, a nondeterministic response might be derivable from a measurement of the electrical output of the structure, in that the nondeterministic response is, or is based on: a time taken for an electrical input to trigger the nondeterministic electrical output response; and/or an input value at which the nondeterministic electrical output response is triggered; and/or a number of inputs at which the nondeterministic electrical output response is triggered. For instance, an input might be increased or decreased a certain rate until the nondeterministic electrical output response is triggered, or an input might be repeated at the same level or value until the nondeterministic electrical output response is triggered.

There exist known algorithms for converting the probability distribution function of outputs from random number/nondeterministic response generators. These are not discussed in detail here, since they are known in the art of random number generation and processing. However, and as a simple example, to implement such conversion from a flat to a normal distribution, the following parameters would be required: the mean of the Gaussian output that is required (M), the standard deviation of that Gaussian (S); and the range of the flat output that the random number/nondeterministic response generator produces (e.g. numbers evenly distributed from 0 to 1). These are all constants that can be chosen for the application in question, which could then be used with a single shot output (e.g. a discrete output) of a nondeterministic response generator, with a probability distribution function. In the opposite case, for a device producing a Gaussian distribution such as shown in FIG. 3, outputs M and S are constants that can be measured and recorded, then the known, simple relationships be used in reverse to produce a flat output from the Gaussian. It may be necessary to measure a certain number of outputs in the factory in which the device is made, or a facility in which the devices are tested, in order to assess the constants M and S per device, or these may be known for a batch of devices. As discussed above, each structure might, and likely will, have its own unique response characteristic, and so have M and S constants (or similar) that are very specific to the structure in question. With multiple structures, multiple different M and S constants (or similar) or similar can be obtained or used. This is discussed in more detail below.

Practical implementations of the outputs of FIGS. 2 to 4, in terms of the generation of nondeterministic responses, have already been introduced above. More detail is now provided.

FIG. 5 shows how, in one example, the nondeterministic response could be based on timing. A signal generator 40 provides an input current that ramps up at a constant rate. The input is provided to a structure 42 that provides a nondeterministic electrical output response to such an electrical input, in this case a resonant tunnelling diode, as described above. The output of structure 42 is provided to a reset input of a counter 44 via a resistor 46. A pulse generator 48 provides a pulsed input to counter 44. The counter provides a pulsed output 50.

In use, the ramping of the input current will, over time, cause structure 42 to switch states, e.g. in terms of resistance, as discussed above. This time is nondeterministic, for example as shown in and described with reference to FIGS. 2 and 3. That is, there is a probability that the switch will occur at some nondeterministic point on the ramp up of current, through the unstable region of the characteristic of structure 42. The switch in state, and appropriate output, of structure 42 may then be used to reset the counter 44 which, of course, will have an impact on the output 50 of the counter 44. The time to reset, or time from a previous reset, or so on (depending on implementation details) can be used as the nondeterministic response in the form of a number e.g. a number of pulses to, or since, reset of the counter 44. Alternatively, resetting the counter 44 might have an affect on the output 50 in some other way, which will cause the output to be nondeterministic for one or more other reasons.

In another example, not shown, a similar circuit can be used to ramp up (or down) an input current, and the nondeterministic response can be, or be derived from (e.g. normalised in some way) the current at the point of the switch in state of the diode. That is, in this example, a time-based nondeterministic response might not be used.

FIG. 6 shows another example of how nondeterministic responses might be generated. In this example, a current source 60 repeatedly challenges a structure 62 that provides a nondeterministic electrical output response to such an electrical input, in this case a resonant tunnelling diode, as described above. Repetition might be implemented via a switching operation of a transistor 64. Structure 62 will switch states in a nondeterministic manner, as described above i.e. in the region of electrical instability, the diode will sometimes switch states at a particular input value, and will sometimes not switch states at that same input value. The output of structure 62 will then be used to provide a high or low (depending on the output state of structure 62) output to a shift register's 66 serial input, via resistor 68. Pulse generators 70 can be used to provide pulsed inputs to the transistor 64 and shift register 66, to pulse the switching of the transistor 64 and provide a pulsed driving signal/input to register 66 for use in providing a pulsed output stream 72.

Overall, the pulsed output stream 72 is provided by the register 66, for example in the form of a binary stream. The nature of the stream 72 will depend on the high/low inputs to the register 66 by structure 62, and will therefore be nondeterministic in nature. The stream 72 might be used in its continuous entirety, for example over a period when a nondeterministic output stream is required. In another example, the stream might be sampled or segmented to obtain or derive one or more nondeterministic responses. This might be achieved by processing of the stream 72, or driving of the register 66, or by control of the transistor 64, or in any way that fits a practical application.

In the example of FIG. 6, multiple switches in state of the structure are used to generate nondeterministic changes in an output stream. Of course, only a single switch in state might be sufficient to generate a nondeterministic output from the device or circuit as a whole. Multiple switches in state might be convenient to easily generate a continuous or longer output stream. In another example, the number of inputs to the diode required to change the state of the diode might be the nondeterministic response. In any event, in all of these related examples it is a number of inputs to the structure that determines how the nondeterministic response is generate (e.g. as opposed to a time or input value, as with other examples).

As with any example herein, knowledge in advance of the region of electrical instability might be useful in some circumstances. For example, slowly ramping up the current for 15 seconds might not be necessary or useful, if nothing ever happens in terms of changes of state of the structure for 14.5 seconds. It might be far better to ramp the current more quickly, or from a level much closer to, or within, the region of instability. Similarly, providing a repeated input current in a region where the structure does not exhibit electrical instability might be pointless. So, providing an input current in a region where instability is known to occur might be more useful. In other words, tuning the input relative to the region of instability (e.g. the probability distribution where switches in state take place) might be very useful. Knowledge in advance might be obtained during manufacture or testing of the device, or in a calibration or testing phase, much as when statistical constants M and S, described above, might be determined.

As described above, structures exhibiting quantum mechanical confinement in addition to electrical instability might offer particularly unique responses to electrical inputs, and so tuning of inputs relative to those unique responses might be easier and/or offer greater control or precision in the generation of nondeterministic responses. For example, inputs might be finely tuned around a very well defined peak or trough in an output characteristic of such a structure. Also, very similar structures, or even structures considered 'identical' in every day terms (e.g. diodes in a diode array) might have subtly but distinguishably different outputs that can be used to generated nondeterministic responses in different ways, for example with different probability distributions.

FIG. 7 shows how different structures can have different output characteristics, including different probability distributions in terms of their nondeterministic electric output responses to electrical inputs. For example, a first resonant tunnelling diode has a switching probability distribution that exhibits a peak 80 around 0.75 mA. However, there is a spread of probabilities 82 about that peak 80, at which input current a switch takes place, taking a Gaussian distribution form. A second resonant tunnelling diode has a switching probability distribution that exhibits a peak 84 around 2.75 mA. However, there is again a spread of probabilities 86, taking what will, over time, be a Gaussian distribution form, about that peak 86. In fact, it might be noted that the spread 86 is not a complete Gaussian. This is because, for that second diode, an insufficient number of switching events has been prompted (so far) to demonstrate the full Gaussian distribution. This in itself, is interesting, and in fact highlights the nondeterministic nature of the output. If only a small number of outputs are obtained, they will fall within and begin to define a probability distribution. However, for any one event, the output cannot be predicted with certainty, and an overall appreciation of the output form can only be determined over time, with many output events. Even with many outputs, an output can only be predicted with a certain probability—i.e. not with absolute certainty.

FIG. 8 depicts a similar differential output for two different diodes, but this time in terms of counts at which currents switching takes place. Even though both of these diodes exhibit switching at much closer peak current values than was the case for FIG. 7, is it still very clear from FIG. 8 that the probability distributions 90, 92 for each of the different diodes is very different.

Key to the preceding paragraphs, and FIGS. 7 and 8, is that different structures provide different probability distributions. So, if multiple structures can be used easily and quickly, different probability distributions, or tuning with respect to such distributions, can be taken advantage of easily and quickly. FIGS. 9 to 13 show how such structures may be provided and used.

FIG. 9 schematically depicts a device according to an example embodiment. The device comprises a variable current source 100 for powering a plurality of N diodes 102, one or more of which may include resonant tunnelling diodes. A voltage measuring device 104 is provided to measure the combined output of different series combinations of 2 to N diodes 102. A switching arrangement 106, in this case a multiplexer, is used to selectively connect together in a series a desired combination or number of the N diodes 102. The switching arrangement 106 may be made to achieve these electrical combinations by appropriate input 108, for example from a controller or the like (not shown).

By appropriate control of the switching arrangement 106, different numbers of the N diodes 102 are electrically connectable in series. Each different combination can be challenged, and a different nondeterministic response (or related probability distribution) from the combination can be obtained, in the manner described above. So, the device provides a way of easily providing a large number of different probability distributions.

The distributions can be established in advance, for example during manufacture, testing, calibration or setup. Indicative values or date relating to those distributions for each diode/diode combination can then be stored and looked up for use as and when necessary.

In a related but different example, knowledge of the different probability distributions may not be obtained in advance, for whatever reason. In some instances, this uncertainty could be advantageous in terms of nondeterministic outputs. For example, with a known distribution, a certain output has a certain probability of happening, and a user/application might have that knowledge. Without knowing the distribution, it is not possible to even determine the probability of a specific output happening.

The number of different probability distributions that are available using the device shown in and described with reference to FIG. 9 increases, generally, linearly with an increase in number of the structures used in the series arrangement. This may be adequate in certain circumstances, for example if the number of devices connected or connectable in series provides a desired number of probability distributions for the application in question. A desired number might simply be enough to have a certain number or makeup of probability distributions for use, or, conversely, to make it hard to determine the probability distributions that are available with the device, for whatever reason (e.g. to increase the uncertainty of the output of the device as a whole).

In order to vastly increase the number of probability distributions that are available, it may be desirable that the device comprises structures that are in an arrangement whereby an increase in the number of such structures in that arrangement leads to an exponential-like increase in the number of available probability distributions. That is, there is an exponential relationship between the number of structures and the number of available probability distributions.

FIG. 10 schematically depicts a device according to an example embodiment. A variable current source 110 is provided, as well as a generically depicted and located voltage measuring device 112, largely as already described above. In this embodiment, N diodes 114, one or more of which may be resonant tunnelling diodes, are connected to N respective switches 116, the N switches being controllable by appropriate inputs 118 via a controller or similar (not shown). Connected or connectable to those N diodes 114 are K resonant tunnelling diodes 120, each of which diodes 120 is connected to a respective switch of K switches 122. The K switches 122 are controllable by respective inputs 124, again by a controller or similar (now shown).

The device might optionally comprise additional diodes 126 for either current limiting purposes or to provide a single probability distribution if, for whatever reason, there is no need to use the array or arrangement of N and/or K diodes 114, 120.

With the arrangement shown in FIG. 10, the number of possible measurements by selective operation of the switches 116, 122, or in other words the number of possible or available probability distributions, is equal to $2^{N+K}$. So, the desired exponential relationship is obtained. It will already be appreciated that only a relatively small number of diodes/switches are required in order to achieve a very large number of possible probability distributions.

The exponential nature of the probability distributions can be further increased by connecting a number of structures in parallel to form a unit, and then connecting a number of such units in series or parallel. For instance, FIG. 11 shows how N resonant tunnelling diodes 130 may each be connected to one of N respective switches 132 (e.g. in a multiplexer or similar), which are controllable by N inputs 134. An optional diode 136 might be provided to provide a single probability distribution if, for whatever reason, there is no need to use the switch arrangements 132 and respective diodes 130. In many ways, FIG. 11 represents a portion of FIG. 10. The number of possible structure combinations in the example of FIG. 11 is $2^N$. Even in isolation, a large number of probability distributions can be easily obtained. However, this number can be easily increased, as will now be described.

FIG. 12 shows that the device of FIG. 11 might be referred to or defined as a unit 140. This might be for explanatory purposes, and/or constructional purposes. That is, 'unit' might simply be an easy way of explaining the structure, and/or the structure can be made in such unit form for easy replication. FIG. 13 shows how a number of these units could be connected in a series 150, along with a variable current supply 152. A voltage measuring device 154 is also generically shown as being provided and located, for measuring output across one or more units 150. A current limiting diode 156, or a diode providing a single probability distribution, might also be provided, for the reasons described above. If the number of units in the series relationship 150 is taken to be M, then the number of possible measurements by selective operation of the switches forming the units 150 is equal to $2^{N \times m}$. With such a relationship or similar, a potentially huge number of possible probability distributions could be obtained with a relatively small number of structures.

In any example, it will be noted that the output measuring device is only generically depicted, and its type, nature and location (including its physical location and/or the location of its electrical connections for output measurement) might be modified to suit the application.

It has already been described above how a response derivable from the structure exhibiting instability (e.g. a structure exhibiting negative differential resistance) is, in some embodiments, a current-voltage spectrum, or derivable from such a spectrum. Of course, different spectra may be used, depending upon the way in which the structures are electrically challenged or the output therefrom measured, for example voltage, current, capacitance, resistance, memristance, or integrals or derivatives thereof. In some instances, a spectrum might not actually be necessary, and a device will be challenged to a particular value or level. So long as the structure exhibits a nondeterministic output to the input, that structure may be used in embodiments.

The response of the structures discussed above, particularly those whose responses are based on quantum mechanical confinement, is typically determined by the atomic structure of the structure. The structure itself (i.e. its atomic structure) can for example be deliberately altered in order to deliberately alter the response that is obtained from electrically challenging the structure. This can be achieved by heat or electrical biasing, above certain levels specific to the device in question. The electrical biasing might provide that heat, or a dedicated heater could be provided for each structure, a plurality of structures, or for all structures. For instance, the structure might be physically altered to change the probability distribution of the input-output relation in a region of electrical instability. This might be useful for nondeterministic response generation reasons, or to simply reset the structure or device in some way. The structure might be altered to the extent that the structural device is damaged or destroyed, or at least damaged or destroyed to the extent that nondeterministic responses can no longer be obtained, or obtained to a desired extent (e.g. with a desired probability distribution).

In the above examples, the device comprising the structures exhibiting nondeterministic responses to an electrical input has also been described as the very same device that undertakes the measurement of output from those structures. However, FIG. 14 shows that this is not necessarily the case in all embodiments. In another example, as shown in FIG. 14, there may be a more system-like approach to the embodiment of the invention. The system might comprise a first device 160 for challenging a second device 162. The second device 162 might comprise the structures exhibiting nondeterministic responses to an electrical input, as discussed above. The second device 162 might simply facilitate the challenge of those structures, and may not necessarily challenge those structures directly, or at all. That is, the second device 162 might comprise one or more electrical communicators, connections, connectors, or switches that allow connection or similar of a first device 160, that first device 160 being the device that actually challenges the structures of the second device 162. For instance, the first device 160 might be provided with a power source or measurement of electronics or similar.

Of course, various combinations of the system of FIG. 14 are possible. For example, the first device 160 might have more or fewer components, and the second device 162 comprise more or fewer components. The second device 162 might comprise numerous switches and the like for electrically combining or selectively connecting one or more different structures, and the first device 160 might provide the power supply and measurement electronics. Alternatively, the first device 160 might also provide the switches necessary for connecting the structures provided in the second device 162. The first device 160 might implement the altering of the structures, to change the probability distribution(s) that those structures provide when challenged.

In general, one or more devices of a system, or a device if used in isolation, will require some sort of power supply (e.g. variable) and some sort of measurement electronics, in addition to the structure or structures that exhibit nondeterministic responses to an electrical input. Of course, additional features and/or functionality might be provided by such a device or system. A variable power source could come from an oscillating source, such as a clock/oscillator signal, rather than requiring a separate, dedicated entity.

The device, or part thereof, or system part that challenges the structure or structures may have other functionality. In particular, that functionality may depend on the nondeterministic response that is generated, for example with the response being used in computer encryption, lotteries, scientific modelling, or gambling.

FIG. 15 is a flowchart depicting in more general form the methodology described above. The method comprises generating a nondeterministic response to a challenge. In more detail, the method comprises challenging a structure to generate the nondeterministic response 170. The structure exhibits a nondeterministic electrical output response to an electrical input. The generation is achieved by electrically measuring an output of the structure 172. The nondeterministic response is then derivable from the electrical measurement 174. This could include the nondeterministic response being the electrical measurement, or that measurement being used or processed to derive a nondeterministic response in a form that is required by the application in question.

It has already been described above how nondeterministic responses can be generated and used. The number of responses can be vast, since the nondeterministic response is unpredictable, and can be used in many different ways (counts, times, input values, etc.). Methodology of the invention might also or alternatively comprise using a or the generated nondeterministic response as a seed for a software pseudo-random, or quasi-random, number generator. This might be a very convenient way of amplifying the number of nondeterministic responses, or quasi or pseudo nondeterministic responses, available with any one device or structure.

In certain applications or implementations, the word "challenge" might have a very specific meaning, for example issuing a challenge to a device or structure to see if it responds in a way that is as expected (or otherwise), for example to determine if the device is authentic (or otherwise). However, in the embodiments above, the word "challenge" has been used more broadly, for example amounting to issuing a request, or read, or query to the device or a structure thereof, to obtain a nondeterministic response. So, the terms might be used interchangeably, at least in some embodiments.

'Nondeterministic' and 'random' might be used interchangeably in some circumstances. However, some mathematical understandings or interpretations of something that is truly 'random' (i.e. as opposed to a more everyday understanding of 'random') might be so specific as to contradict some of the nondeterministic devices and methods described above, or the results derivable therefrom. Hence, 'nondeterministic' has been used more generally herein, as a more general term.

It is important to note from the above that, as clearly disclosed above, the nondeterministic response is only ever obtained via a challenge to one or more structures that each exhibit a nondeterministic electrical output response to an electrical input. That is, the nondeterministic response is provided only by those one or more structures. In other words, whilst other components may be used to in some way process (e.g. digitise or smooth) that nondeterministic response, those other components are in no way part of the generation of that nondeterministic response, and do not contribute to the nondeterministic nature of the response. This might be phrased as no component being involved in the generation of the nondeterministic response output, other than the or each structure that exhibits a nondeterministic electrical output response to an electrical input. That is, a change in state or output level that determines or provides the nondeterministic response is only derived directly from the challenge on the structure(s). This in contrast with, for example, a nondeterministic response being generated using a chaotic oscillator that relies essentially on interaction between a metal-oxide-metal device and a capacitor. According to the claimed invention, it has been realised that such interaction is not only not required, but is wasteful in terms of unnecessary components. Instead, the nondeterministic response is obtained solely via a challenge to only one or more structures that each exhibit a nondeterministic electrical output response to an electrical input, excluding the need for other components.

Again, as above, a structure could be challenged in isolation, or as part of a number (e.g. in series or parallel) of such structures. Those structures may, as above, be nominally the same, e.g. formed at the same time, formed on the same chip or substrate, formed in the same batch, or be nominally designed and/or fabricated to be the same in general functional terms. This makes it easier and simple to provide or form the structures, and/or to provide a device or system for generating a nondeterministic response. Using only a single structure that exhibits a nondeterministic electrical output response to an electrical input is the simplest, cheapest and perhaps generally easiest implementation (i.e. in contrast with using multiple structures). However, multiple structures may be used beneficially, as described above.

Using a structure that exhibits negative differential resistance is a good example of a structure that exhibits a nondeterministic electrical output response to an electrical input, as discussed in detail above. The negative differential resistance is the feature that provides the nondeterministic electrical output response in this example (e.g. as opposed to being a peripheral feature, not involved in the generation of the nondeterministic electrical output response).

Using a structure that alternatively and/or additionally exhibits quantum mechanical confinement (e.g. to involve, allow or facilitate quantum mechanical tunnelling) is also beneficial in terms of the sharpness of transitions between states, sharpness of peaks, efficiency, simplicity, and so on, as already described in more detail above. This might be in contrast with, for example, a device that relies on thermal or white noise to generate some uncertainty, since such devices may be subject to control and external manipulation by changing temperature, for example. A structure that alternatively and/or additionally exhibits quantum mechanical confinement provides output uncertainty that emerges from the intrinsic uncertainty of quantum processes, and so offers more stability and/or a better source of uncertainty.

As discussed above, a diode, and in particular a resonant tunnelling diode, is a good example of a structure that satisfies most, if not all, of the above criteria. Such a structure is very simple, and very effective at meeting such criteria.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of generating a nondeterministic response, the method comprising:
    generating an electrical input using at least one of a voltage source or a current source;
    transmitting the electrical input from the voltage source or the current source solely to one or more diodes exhibiting a negative differential resistance in response to the electrical input to generate an electrical output including one of an output voltage or an output current solely to a sensor for measuring the output voltage or the output current, wherein a magnitude of the electrical output is nondeterministic with respect to the electrical input;
    electrically measuring the output voltage or the output current of the electrical output from the one or more diodes to produce a nondeterministic response.

2. The method of claim 1, further comprising converting the nondeterministic response into a random number generator (RNG) output.

3. The method of claim 1, wherein the one or more diodes further exhibits quantum mechanical confinement.

4. The method of claim 1, wherein generating the electrical input further includes generating a plurality of pulsed inputs from the voltage source or the current source for transmission as the electrical input, the plurality of pulsed inputs including a plurality of input currents or a plurality of input voltages.

5. The method of claim 1, wherein the one or more diodes is a resonant tunneling diode (RTD), a Gunn diode, or a memristor.

6. A device for generating a nondeterministic electrical response, the device comprising:
    a signal generator for transmitting an electrical input including one of an input current or an input voltage;
    one or more diodes having an anode terminal coupled to the signal generator, such that the electrical input is transmitted solely to the one or more diodes, wherein a composition of the one or more diodes exhibits a negative differential resistance in response to the electrical input, and the one or more diodes converts the electrical input into an output signal at a cathode terminal, wherein a current or a voltage of the output signal is nondeterministic with respect to the electrical input; and
    an electrical sensor coupled solely to the cathode terminal of the one or more diodes, wherein the electrical sensor converts the voltage or the current of the output signal from the cathode terminal of the one or more diodes into a nondeterministic electrical response.

7. The device of claim 6, wherein the one or more diodes includes at least one resonant tunneling diode (RTD).

8. The device of claim 7, wherein the signal generator generates a plurality of pulsed inputs as the electrical input, the plurality of pulsed inputs including a plurality of input currents or a plurality of input voltages.

9. The device of claim 6, wherein the electrical sensor converts the current or the voltage of the output signal from the cathode terminal of the one or more diodes into a nondeterministic electrical response, based on a time interval in which the signal generator transmits the electrical input.

10. The device of claim 6, wherein the one or more diodes is a resonant tunneling diode (RTD), a Gunn diode, or a memristor.

11. A device for generating a nondeterministic electrical response, the device comprising:
 a pulse generator for transmitting a plurality of electrical inputs, each of the plurality of electrical inputs including one of an input current or an input voltage;
 a resonant tunneling diode (RTD) having an anode terminal coupled solely to the pulse generator, such that the plurality of electrical inputs are transmitted to the RTD, wherein a composition of the RTD exhibits quantum mechanical confinement and a negative differential resistance in response to the electrical input, and the RTD converts the plurality of electrical inputs into an output signal at a cathode terminal, wherein a current or a voltage of the output signal is nondeterministic with respect to the plurality of electrical inputs; and
 an electrical sensor coupled solely to the cathode terminal of the diode, wherein the electrical sensor converts the voltage or the current of the output signal from the cathode terminal of the diode into a nondeterministic electrical response as a random number generator (RNG) output.

12. The device of claim 11, wherein each of the plurality of electrical inputs are selected from a range of input currents or a range of input voltages.

13. The device of claim 11, wherein the electrical sensor converts the current or the voltage of the output signal from the cathode terminal of the RTD into a nondeterministic electrical response, based on a time interval in which the pulse generator transmits the plurality of electrical inputs.

14. The device of claim 11, wherein the RTD comprises a plurality of RTDs coupled between the pulse generator and the electrical sensor.

* * * * *